United States Patent Office 3,526,483
Patented Sept. 1, 1970

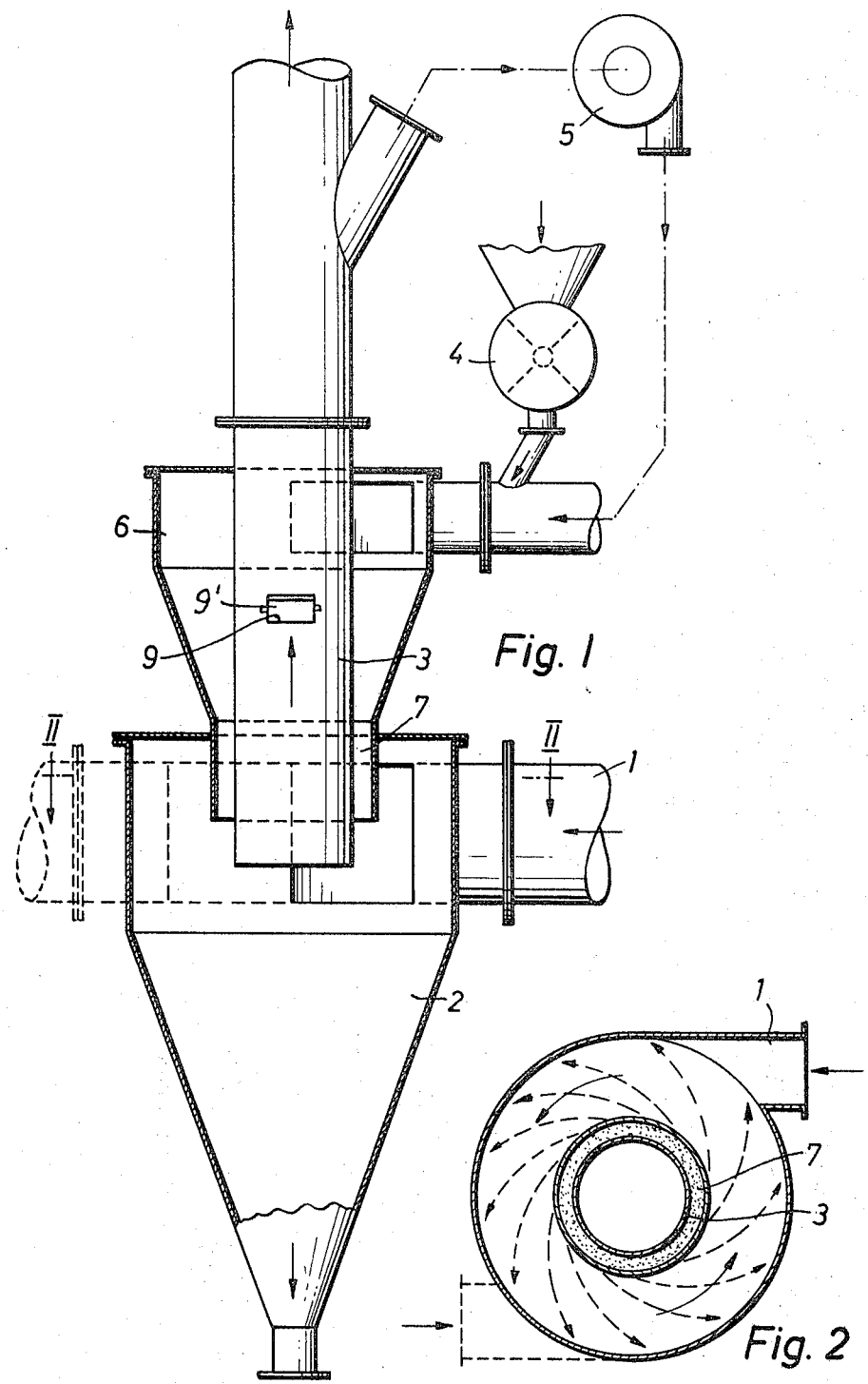

3,526,483
DEVICE FOR TREATING FINE-GRAIN MATERIAL BY CONTACT WITH GAS
Herbert Deussner, Cologne-Dellbruck, and Rolf Jipp, Cologne-Konigsforst, Germany, assignors to Klockner-Humbolt-Deutz Aktiengesellschaft, Cologne-Deutz, Germany, a corporation of Germany
Filed Nov. 4, 1966, Ser. No. 592,111
Claims priority, application Germany, Nov. 6, 1965, K 57,590
Int. Cl. B01j 2/16
U.S. Cl. 23—284   13 Claims

ABSTRACT OF THE DISCLOSURE

Device for treating fine-grained material by contact with gas, such as for heat treating or deacidifying cement raw material includes a treatment chamber having a supply opening, a cyclone having a discharge opening communicating through the supply opening with the treatment chamber, a spent gas channel extending substantially coaxially through the cyclone into the chamber, means for supplying material to be treated to a gas flow passing through the cyclone and into the treatment chamber, and means for circulating the gas flow and entrained material through the treatment chamber at a distance spaced from the wall of the chamber so that the entrained material at times moves in a direction following the gas flow and, under the effect of centrifugal force, in a direction transverse to the gas flow direction toward the chamber wall.

---

Our invention relates to a device for treating fine-grain material by contact with gas, for example preheating and deacidifying dry cement raw material. More particularly, our invention relates to such a device wherein the material is fed into a gas flow circulating through a chamber and spaced from the chamber walls. The material intermittently follows the gas flow and moves transversely thereto under the influence of centrifugal force toward the chamber walls.

A device is already known wherein a heat treatment (preheating) and a chemical treatment (deacidifying) of dry raw material takes place by means of heated gas in a reactor, consisting, for example, of a cylindrical chamber with a horizontal axis. The hot treatment gas enters tangentially into the cylindrical chamber from below and travels in a vertical direction. The waste gas is discharged at both circular surfaces of the chamber in the direction of the horizontal axis of the chamber, while the raw material is fed into the gas flow at both surfaces of the chamber in the vicinity of the horizontal axis of the chamber in an amount up to respectively substantially 50% of the dust quantity. The gas flow produces a centrifugal force field with a horizontal axis within the chamber. The dust-like product is caught in the centrifugal force field and is advanced through the gas on a spiraling path following the gas flow and moving transversely thereto, that is, in a transverse flow or in a cross-current to the gas from the interior of the chamber toward the outside thereof to the chamber wall. The chamber wall or casing has an opening at its lower portion through which the preheated or deacidified material is discharged from the reactor drum. It is known that the transverse flow guidance or crosscurrent guidance of the material and gas results in higher heat exchanges than are attainable with a simple direct flow guidance of the media. If two or more of such drum-shaped heat exchangers or reactors are connected, for example in series in a vertical direction so that the material is passed in a downward direction from above successively through these devices, while the gas flows successively through these devices in the opposite direction, i.e., vertically upwardly from below, a heat treatment or chemical treatment on counterflow of the material and gas is achieved with a combined transverse flow or crossflow treatment of the material in the heat exchanger or the reactor stages. The form in which the material is present in the gas flow during the treatment period is a decisive factor in the effect obtained by the preheating or deacidifying of the raw dust in the transverse flow or in the crosscurrent of the material and gas within a centrifugal force field produced by the gas. For these processes, the heat exchanges and the chemical reactions must be carried out for only an extremely short treatment period within the centrifugal force field. If part of the short treatment period is required for first desegregating, loosening, and finely distributing the dust-like product in the gas flow in order to provide favorable preconditions for the heat treatment of the material, this time is lost to a heat exchange or to a chemical reaction with high effect within the centrifugal force field because the material within this period of time is rather preponderantly present in conglomerate or concentrated form in the gas flow and consequently offers inadequate contacting surfaces for thermal or chemical action. These undesirable heat-exchange conditions or reaction conditions are also present in the aforementioned known device because the material, during operation of that device, is supplied in compact form to the gas flow and a considerable portion of the treatment path or the treatment period in the reactor drum is necessary for its dispersion and subdivision into fine particles. According to a proposal in German patent application K 54,438 IVa/12g, filed Nov. 4, 1964, and assigned to the assignee of the instant application, treatment stages are provided comprising two cyclones located one above the other wherein the upper cyclone is in open connection at the bottom end thereof with the lower cyclone. To each cyclone there is tangentially supplied a portion of the hot treatment gas. The material to be treated is added to the gas flow leading to the upper cyclone. The kinetic and thermal energy present in the upper cyclone portion of the gas flow thereby serves essentially for accelerating, dispersing, and preheating the particles of material, whereas the lower cyclone portion of the gas flow serves advantageously for carrying on the heat treatment of the material.

It is an object of our invention to provide a device which avoids the foregoing disadvantages of the hereinbefore mentioned previously known devices, and more particularly, to provide a device wherein the material to be treated is already in loosened and uniformly distributed form when first introduced into the center flow of the treatment gas so that it is prepared to be exposed to the action of the treatment gas during the entire period in which it is in the chamber.

With the foregoing and other objects in view, we provide in accordance with our invention a device which advantageously comprises a cyclone connected in advance to or downstream of the treatment chamber for the purpose of dispersing the material to be treated. The outlet or discharge opening of the cyclone is tightly connected with the supply opening of the chamber and is advantageously located in the vicinity of the waste gas channel extending upwardly out of the chamber and through the cyclone. A particularly favorable embodiment is provided when the supply opening of the chamber is in the shape of an annular ring about the waste gas channel which is coaxial and concentric to the chamber. By having the longitudinal axes of the cyclone and chamber extend coaxially and vertically, the material to be treated reaches the chamber under the action of gravity.

In accordance with a further feature of our invention, the exhaust or spent gas conduit is provided with one or more openings in the vicinity of the cyclone, through which the working gas of the cyclone or a portion thereof is withdrawn. For the purpose of correctly metering the quantity of withdrawn gas, means are provided for altering the cross section of the openings.

Since the material to be treated which discharges from the cyclone has a rotational velocity derived from the cyclonic process in addition to a velocity or rate of fall thereof, it is advantageous to construct the treatment chamber in accordance with another feature of our invention so that the rotational direction of the gas whirling about in the treatment chamber is opposite to the rotational direction of the gas whirling about in the cyclone. Due to the consequently higher relative velocity at which the material and gas encounter one another in the treatment chamber, heat transfer to the material is accelerated so that the allowable throughput quantity is increased.

In accordance with yet another feature of the invention, the gas flow acting as working gas necessary for introducing the energy required to disperse the material to be treated in the cyclone, is conducted as a subsidiary flow loop of the hot gas flow and is advanced by means of a fan or blower disposed in this subsidiary flow.

For larger installations, also in accordance with our invention, the serial and parallel connections of several groups consisting of cyclones and chambers are provided, the groups being located spatially staggered vertically or horizontally relative to one another.

With the aforementioned heretofore known device, the branched subsidiary gas flow necessary for operation of the cyclone is at times discharged, together with the hot gas flow in which the granular material is to be treated, through a central exhaust or spent gas channel out of the chamber. The cross section of the spent gas channel must therefore be the sum of the cross sections of both gas flows from the lower end of the spent gas channel, in the treatment chamber up to the branch location of the subsidiary gas flow, because otherwise, due to the increased pressure loss, it would be necessary to increase the power of the blower or fan driving the hot gas flow. The dimensioning of the lower end of the spent gas channel which extends into the chamber is, however, subject to specific physical laws inherent in and known for cyclone separator construction. The diameter of the dipping or downcomer tube of a cyclone, i.e., the spent gas channel, when considered with regard to the best possible separation that can be effected, will have a rather specific ratio to the cyclone diameter. The cyclone diameter proper is determined in turn by the main gas quantity flowing therethrough. Possible variations of the quantity of the main gas flow and/or the amount of the subsidiary gas flow influence one another when they discharge from the same channel.

In order to be able to dimension the dipping tube cross section independently of the diameter of the subsidiary gas flow according to the physical laws governing cyclone separator construction, we provide further in accordance with our invention a second tube surrounding the spent gas channel which, through the annular cross-sectional space defined therebetween, serves for the discharge of the subsidiary gas flow necessary for operating the cyclone.

In accordance with further features of our invention, the lower end of the spent gas channel, which is identical to the dipping or downcomer tube of a cyclone, extends advantageously more deeply into the chamber than the second tube. The dipping tube end thus is located outside of the region disturbed by the subsidiary gas flow. There is also provided a third tube, concentric and coaxial to the others, and forming the supply opening of the chamber. The third tube is shorter than the second tube, whereby the material to be treated is prevented from being entrained by the subsidiary gas flow into the flow circuit.

Other features which are considered as characteristic for the invention are set forth in the appended claims.

Although the invention is illustrated and described herein as embodied in device for treating fine-grain material by contact with gas, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a diagrammatic longitudinal sectional view of a cyclone and chamber group assembled in accordance with our invention;

FIG. 2 is a cross-sectional view taken along the line II—II in FIG. 1 in the direction of the arrows;

Figure 3:
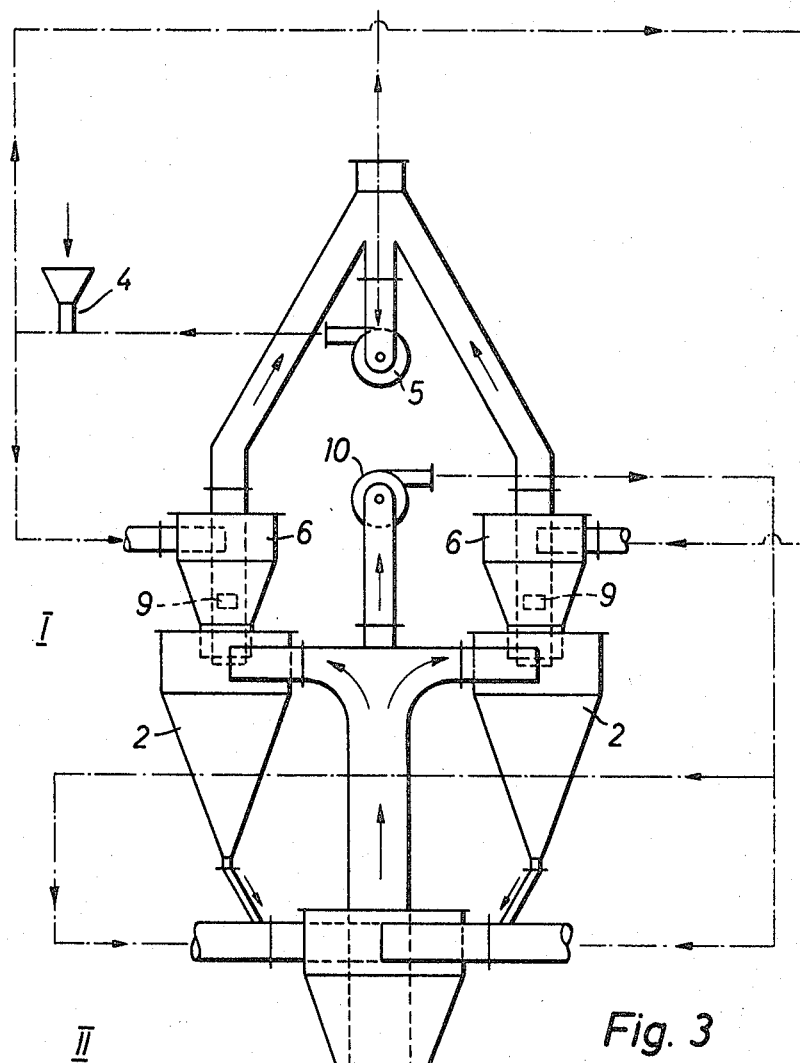
FIG. 3 is a diagrammatic sectional view of an assembly of groups of cyclones and chambers, such as shown in FIG. 1, in the form of a unitary installation.

Since it is more complicated to feed a dust-like product in a centrifugal force field with horizontal axis into the center of the flow of the gas in the direction of this axis, their is provided in the illustrated embodiments of the invention a centrifugal force field with a vertical axis which is produced in a conventional manner in a vertically disposed treatment chamber 2, for example a cyclone, by a treatment gas. In order to feed the dust-like product in accordance with our invention with the desired dispersion into the center of the centrifugal force field of the chamber 2, a cyclone 6 is located above the chamber 2 in coaxial vertical alignment therewith. The material to be treated that is located in the chamber 2 is pneumatically fed to the cyclone 6 by a portion of the spent or waste gas from the chamber 2, to which the necessary mechanical energy is furnished beforehand by a fan 5. The portion of the spent gas and the solid product contained therein in desired dispersion, preferably enter the inner space of the chamber 2 beneath the cyclone 6 together through a channel 7 which advantageously has an annular ring-shaped cross section and is located at the periphery of the spent gas channel 3 of the chamber 2. As the portion of the spent gas is conducted out of the chamber 2 through the spent gas channel 3 in an upward direction as indicated by the associated arrows, the dispersed solid material falls into the flow center of the centrifugal force field which is produced by the hot gas in the chamber 2, so as to be fed also in a known manner on a spiralling path in a transverse flow or cross current to the gas toward the outer chamber walls, and in fact in a very fine loosened and distributed or dispersed form in the gas flow.

While the treated gas is separated and discharged at the lower portion of the chamber 2, the spent gas in the chamber 2, preferably together with the portion of the spent gas with which the pneumatically supplied material from the cyclone 6 is passed into the chamber 2, is discharged through the spent gas channel 3. This spent gas portion for pneumatically supplying the material can alternately, partially or completely be discharged into the channel 3 by suitably adjusting the adjustable openings 9 in the spent gas channel 3 which extends coaxially to the cyclone 6. The flow directions of the centrifugal force fields which are present in the cyclone 6 and in the chamber 2, can be selectively formed so that they run in the same direction or opposite to one another.

The hot treatment gas passes through the tube 1 into the treatment chamber represented by the cyclone 2 and is discharged through the spent gas channel 3 as exhaust gas from the preheating or deacidifying system. The cooled raw dust material is fed through a rotatable floodgate or lock device 4 to a portion of the spent gas which is driven by the fan 5 in the subsidiary flow path of the hot gas flow and is pneumatically fed to the cyclone 6 in which the dust material is pretreated in the same flow as the the portion of spent gas. The portion of the spent gas and the preheated dust contained therein in very finely dispersed form pass through the annular-shaped channel 7, that is located around the waste gas channel 3, into the inner space of the chamber 2. As the portion of the new spent gas again escapes through the spent gas channel 3, the dust reaches the centrifugal force field produced by the hot gas supplied through the conduit 1.

The dust product moves within the centrifugal force field on a spiral path in a transverse flow or crosscurrent to the gas out of the inner space of the chamber 2 to the outer walls of the cyclone as shown in FIG. 2, and is thereby further preheated or deacidified in a short period and under favorable treatment conditions, which exist due to the dispersion of the material. The portion of the spent gas in the cyclone 6 can be selectively withdrawn entirely or partly through an opening 9 in the spent gas pipe 3 by means of a butterfly valve 9' or other suitable adjustment devices.

In FIG. 3 there is shown a further embodiment of our invention wherein several groups consisting of cyclones and chambers are assembled, comprising a vertically disposed two-stage preheating and deacidifying system with stages I and II located one above the other.

The upper stage I serves predominantly for preheating the raw dust and is formed of two lower cyclones 2 connected in parallel and having respective cyclones 6 located above them for supplying the dispersed material to them. In the stage II in which the deacidifying of the preheated raw dust is predominantly carried out, there is provided only one main cyclone with a smaller cyclone located above it. The cold or preheated raw dust is pneumatically supplied into the upper cyclones of the stages I and II through two reenergized spent gas loops at different gas temperatures with the aid of the fans 5 and 10. Since the raw dust is transported and supplied by pneumatic means to the preheating and deacidifying stages I and II, it is also possible to dispose the stages I and II horizontally adjacent one another instead of vertically on top of one another.

Due to the arrangement of stage I as shown in FIG. 3, each of the upper cyclones of this stage can be provided with its own supply lock mechanism 4 (FIG. 1) so as to be able to supply a correctly metered mixture of several components to the stage II.

Figure 4:
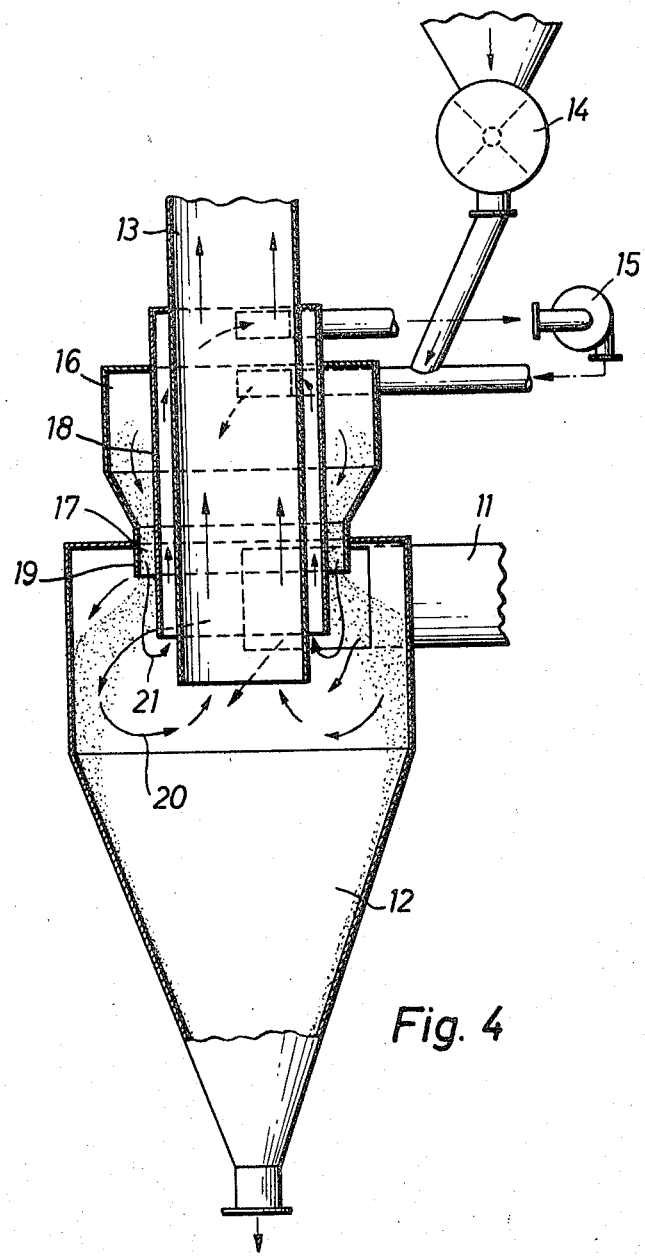
FIG. 4 is another embodiment of the cyclone and chamber group of FIG. 1 with the addition of a second tube surrounding the waste gas channel.

In the embodiment of FIG. 4, the hot treatment gas passes through a tube 11 into a chamber 12 formed by a a cyclone and is discharged through a spent or waste gas channel 13, the so-called dipping or downcomer tube, as spent gas. The granular material is fed through a lock mechanism 14 to a subsidiary gas flow which is supplied by means of a fan 15 in the subsidiary flow circuit to the hot gas flow and is conducted pneumatically to a cyclone 16 in which the material is dispersed. The subsidiary gas flow laden with material is rotatingly passed into the chamber 12 through an annular channel 17 formed between a second tube 18 and a third tube 19, both coaxially surrounding the first or dipping tube 13. As the subsidiary gas flow escapes through the second tube 18, the granular material passes into the centrifugal force field produced by the hot gas entering through the conduit 11 due to the inherent, outwardly directed force of mass produced by rotating entry of the subsidiary gas flow, and wanders in a radially outward direction through the hot gas finally in a combined transverse-direct flow.

The longitudinal sections of the three concentric tubes 13, 18, 19 are readily visible in FIG. 4. The flow lines of the hot gas flow are indicated by the arrows 20 and the flow lines of the subsidiary gas flow are indicated by the arrows 21. FIG. 4 also clearly shows that the dipping tube end opening is located outside of the region wherein the supply of the granular material and the separation thereof from the hot gas flow takes place.

The advantage of the embodiment of FIG. 4 consists primarily in the freedom of action afforded the designer in establishing the major dimensions of the treatment chamber 12, which can accordingly be constructed so that the physical laws governing cyclones are gives optimum consideration. Furthermore, the additional or subsequent incorporation of a device constructed in accordance with our invention into an existing installation is possible since no additional pressure loss occurs in the main flow of the hot gases and therewith the main blower or fan which propels the hot gases through the installation can be retained unaltered as an essential component of the installation. There can furthermore be no obstruction by the material which is to be treated that is displaced by the subsidiary gas flow in the flow loop, because the subsidiary gas flow path is completely separated from the main flow of the hot gases.

With devices constructed in accordance with our invention, a better regulating technique for controlling the treatment process is achieved since only homogenized and uniformly dispersed material is permitted to reach the treatment chamber. The chamber proper is suitable with the same dimensions for greater throughput quantities. The thermal efficiency is improved by the particular high gas velocity and energy with which the upper cyclone can be operated. These advantages are achieved with only a very insignificant additional cost of construction and expenditure of space.

We claim:

1. Device for treating fine-grain material by contact with gas, such as for heat treating or deacidifying cement raw material, comprising a treatment chamber having a supply opening at the top thereof and means for introducing a first gas flow tangentially thereto, a cyclone having a discharge end extending through said supply opening into said treatment chamber, a spent gas channel extending substantially coaxially through said cyclone into said chamber, means for supplying material to be treated to a second gas flow, and means for introducing the mixture of material and gas of said second gas flow to said cyclone so that the mixture passes through said cyclone and into said treatment chamber and the entrained material passes through said treatment chamber at a distance spaced from the wall of said chamber and at times moves in a direction following the second gas flow and, under the effect of centrifugal force, in a direction transverse to said second gas flow direction toward said chamber wall.

2. Device according to claim 1 wherein said discharge end is formed with an opening having a cross section of substantially annular ring shape.

3. Device according to claim 1 wherein the gas of said first gas flow is hot treatment gas, said cyclone forming part of a subsidiary flow loop for said hot gas, and blower means in said subsidiary flow loop for circulating the gas in said loop.

4. Device according to claim 3 wherein said subsidiary flow loop includes a conduit connected tangentially to said cyclone, and said treatment gas supply means comprises a conduit connected tangentially to said chamber, said conduits being so disposed relative to one another as to produce a whirling action of the gas flows in said cyclone and said chamber respectively in opposite rotary directions.

5. Device according to claim 1 wherein said channel is formed with at least one lateral opening in said cyclone for withdrawing spent gas from said cyclone.

6. Device acording to claim 5 including adjusting means for varying the cross section of said opening.

7. Device according to claim 1 wherein a plurality of groups of said cyclone and chamber are connected in series.

8. Device according to claim 7 wherein said groups are arranged above one another on a common vertical axis.

9. Device according to claim 7 wherein said groups are located adjacent one another and are mutually connected by conduits.

10. Device according to claim 1 wherein said spent gas channel is in a first tube, and the gas of said first gas flow is hot treatment gas, said cyclone forming part of a subsidiary flow loop for said hot gas, and a second tube substantially coaxially surounding and spaced from said spent gas channel tube, said second tube and said spent gas channel tube defining therebetween an annular space for discharging subsidiary gas flow from said cyclone into said chamber.

11. Device according to claim 10 wherein said spent gas channel tube extends farther into said treatment chamber than said second tube.

12. Device according to claim 10 including a third tube substantially coaxial to and surrounding said second tube, said third tube forming said discharge opening of said cyclone and said supply opening of said treatment chamber.

13. Device according to claim 12 wherein said second tube extends farther into said treatment chamber than said third tube.

References Cited
UNITED STATES PATENTS

| | | | |
|---|---|---|---|
| 3,083,472 | 4/1963 | Helming | 34—57 |
| 3,364,589 | 1/1968 | Muller | 34—57 |

JAMES H. TAYMAN, Jr., Primary Examiner

U.S. Cl. X.R.

23—1; 34—57, 10; 55—262, 340, 349, 459; 263—53